United States Patent Office 3,300,446
Patented Jan. 24, 1967

3,300,446
AMPHOTERIC RESINS PREPARED BY CONDENSING ALKALI METAL SALTS OF SULFOMETHYL DICYANDIAMIDE WITH FORMALDEHYDE
Lucien Sellet, Saddle River, N.J., assignor to Nopco Chemical Company, Newark, N.J., a corporation of New Jersey
No Drawing. Original application Oct. 5, 1960, Ser. No. 60,576, now Patent No. 3,223,751, dated Dec. 14, 1965. Divided and this application Feb. 23, 1965, Ser. No. 434,638
1 Claim. (Cl. 260—69)

This application is a divisional application of Serial No. 60,576, Sellet, filed October 5, 1960, now U.S. Patent 3,223,751.

The present invention relates to novel compositions of matter, their preparation from (a) anionic linear polymers and (b) cationic and amphoteric aminoplast resins and/or their amino and amphoteric amino resin bases, and their utilization, particularly in the treatment of porous or fibrous substrates.

It is an object of the present invention to provide for novel treating agents, especially for porous or fibrous substrates which are obtained from anionic linear polymers and cationic and amphoteric aminoplast resin as well as their amino and amphoteric amino bases. It is a further object to provide for novel treating agents which when utilized in connection with said porous or fibrous substrates bring about enhanced properties of said substrates. Another object is to provide for procedures for preparing said novel treating agents. A still further object is to provide for improved leather, paper and textile treating agents which impart improved properties when applied to said substrates in such operations as retanning, tanning, dyeing, pigment dispersing, coating textile finishing and adhesion. Other objects will become apparent from the detailed description given hereinafter. It is intended, however, that the detailed description and specific examples do not limit the invention but merely indicate preferred embodiments thereof since various changes and modifications within the scope of the invention will become apparent to those skilled in the art.

The above as well as other objects have been most unexpectedly and successfully achieved in the following manner. I have prepared and utilized in the treatment of various porous or fibrous substrates, resinous products which broadly can be described as mixtures of, complex salts of and condensates of (a) modified and unmodified water soluble anionic linear polymers and (b) water soluble and water dispersible cationic and amphoteric aminoplast resins. In the case of condensates of (a) and (b) above, I can utilize amino resin bases and amphoteric amino resin bases in lieu of the aminoplast resins. By the term mixtures, I mean mixtures of completely neutralized anionic linear polymers and cationic or amphoteric aminoplast resins. By complex salts, I mean the salt formed by reaction between an anionic linear polymer in its free acid form or partially neutralized form and a cationic or amphoteric aminoplast resin. To form the complex salts, the resin functions as a base.

The above products as will be shown subsequently are useful as pretanning agents, retanning agents, tanning agents and as auxiliary tanning agents for preparation improved leather products. Outstanding success has been found when leather resulting from metal salt tannages is treated with my products. For example, my products impart to the leather outstanding light fastness, increased fullness and loading, enhanced tensile strength and smooth grain. These products can be successfully used in such diverse applications in the tanning industry as in the preparation of garment, shoe, glove, suede, sole and mechanical leathers. Also, it has been found that fat liquoring operations are greatly enhanced. This is of special value for leather wherein zirconium salts have been utilized because I have found that my materials prevent the zirconium from reacting with the fat liquoring agents.

My products impart improved properties to substrates other than leather. For example, when applied as die assistants, improve color values and better leveling are obtained in many instances. Some of these products can be utilized as pigment dispersing agents, as agents in fiber and paper coating and as additives in paper making. When added to the beater, they serve as fillers and also improve wet resistance of the resulting paper. They have been found to contribute to enhanced fullness of the treated material, to supply special finishing effects and to exhibit binding and adhesive properties.

The application of my products in connection with a porous or fibrous substrate such as leather can be explained as follows. When a mixture or a complex salt of my two components, viz., the anionic linear polymer and the cationic aminoplast or amphoteric aminoplast resin is used, the mixture or complex salt is applied to the leather in the form of an aqueous solution or dispersion thereof by contacting the leather with said mixture. After the mixture or complex salt is colloidally absorbed to its greatest extend in the leather or other substrate, the pH is progressively lowered at intervals to a pH of about 2.5. In this manner, the cationic and anionic functional groups present in the mixture or complex salt of the anionic linear polymer and aminoplast resin are activated and inter-reacted, thus bringing about precipitation in the fibers of the leather or other porous or fibrous substrate. Alternatively, when a mixture of my two components is used, viz., a completely neutralized anionic linear polymer and a cationic or amphoteric aminoplast resin, the leather can be contacted with the two components successively and finally the two components are interreacted by lowering the pH to about 2.5 to bring about precipitation. Likewise, the two components which make up the complex salt, viz., the anionic linear polymer in its free acid or partially neutralized form and the cationic or amphoteric aminoplast resin can be supplied successively to the leather thus forming the complex salt in the leather. Then the pH can be lowered as indicated above to bring about precipitation in the leather. It must be appreciated however, that the pH value of 2.5 represents an average since this value will vary somewhat depending upon the nature of the mixture or complex salt of my two components which is added. The lowering of the pH can be accomplished by the introduction of water soluble mineral acids, water soluble organic carboxylic and hydroxy carboxylic acids and water soluble acidic metal salts. Examples of the above agents utilized to lower the pH are hydrochloric acid, sulfuric acid, sulfonic acid, formic acid, acetic acid, glycolic acid, diglycolic acid, lactic acid, citric acid, tartaric acid, oxalic acid, aluminum sulfate, basic chrome sulfate and sodium bisulfate.

When a condensate of my two components is utilized, it is applied to the fibrous or porous substrate in a neutral form. Then the pH is progressively lowered at intervals to a pH of about 2.5. In this manner, the cationic and anionic functional groups present in the condensate are activated and interreact thus bringing about precipitation of the condensate in the substrate. Here again, it must be appreciated that the pH value of about 2.5 represents an average since this value will vary depending upon the nature of the condensate. Lowering of the pH can be carried out by using the same water soluble acids and water soluble metal salts referred to previously.

Whether mixtures, complex salts or condensates of my two components are applied to a substrate, impregnation is achieved through colloidal adsorption or through direct affinity of the substrate for the treating agent depending upon the nature of the substrate.

It is known to utilize certain anionic linear interpolymers in the tanning of leather. For example, U.S. Patent No. 2,205,882, Graves, June 25, 1940, describes the use of partially neutralized maleic anhydridestyrene interpolymers as tanning agents. Also, it is known to utilize certain cationic aminoplast resins in the tanning of leather. However, the combination of these two classes of materials, as mixtures or complex salts to be precipitated in a substrate or as condensates to be precipitated in a substrate, has been found to bring about improved, indeed, superior results when compared with the use of the prior art indicated above. The outstanding lightfastness of leather treated with my products was most unexpected. This superiority is in contrast to the leathers treated with naphthalenic or phenolic synthetic tanning agents which have a deleterious effect on leather due to photochemical changes which they undergo. Moreover, the use of my materials also results in products having diverse utilities as indicated above. Additionally, many of the anionic linear polymers and many of the aminoplast resins described herein are in themselves new compositions of matter which can be utilized as taught herein.

ANIONIC LINEAR POLYMERS

The modified and unmodified water soluble anionic linear polymers can be described as follows. They are copolymers of maleic acid, maleic anhydride or itaconic acid and olefinic hydrocarbons which are copolymerizable therewith. The resulting polymer can be utilized in its free acid form or as a partially or completely neutralized ammonium or alkali metal salt, e.g., as the sodium or potassium salt. When the acid form of the copolymer is difficultly soluble or insoluble in water, then the partially or completely neutralized forms are used. In preparing the copolymers, useful comonomers for the maleic anhydride, maleic acid or itaconic acid are one or a mixture of the following ethylenically unsaturated monomers: ethylene, styrene, p-methyl styrene, vinyl ethers such as methyl vinyl ether, ethyl vinyl ether, propyl vinyl ether, vinyl esters such as vinyl acetate, acrylic esters such as methyl acrylate, ethyl acrylate, methyl α-methylacrylate, isobutylene, diisobutylene, acrylamide and substituted acrylamide such as butyl acrylamide. In the above polymers, the maleic anhydride, maleic acid or itaconic acid and the ethylenically unsaturated monomers which are copolymerizable therewith are present in approximately a 1:1 mol ratio. In the case of copolymers of salts of itaconic acid and acrylamide, from about one to three mols of acrylamide can be utilized per mol of itaconic acid salt.

The preparation of the above polymers is well known in the art and this invention is not to be limited by such preparations. Polymerization procedures which can be utilized can be found in, e.g., U.S. Patent No. 2,047,398, Voss et al., July 14, 1936; U.S. Patent No. 2,286,062, Condo et al., June 9, 1942; U.S. Patent No. 2,430,313, Vana, November 4, 1947; U.S. Patent No. 2,490,489, Tauch, December 6, 1949, and U.S. Patent No. 2,378,629, Hanford, June 19, 1945.

The above polymers if desired, can be modified such as by forming their amide ammonium salts or amide amine salts. Also, the polymers can be reacted with salts of sulfoaminomethane, and the modified amide ammonium salts of the polymers can be further treated with salts of sulfohydroxy methane and if desired can be further treated with formaldehyde. These reactions are performed in equimolar proportions with regard to the reactive groups involved. However, this can be varied so as to obtain products of varying characteristics, i.e., products having characteristics lying between the unmodified and completely modified polymers. In other words, the polymers can be partially modified as well as completely modified as indicated above. Thus, by the expression, modified, I mean partially modified as well as completely modified anionic linear polymers.

These modified anionic polymers can be used in connection with cationic and amphoteric aminoplast resins and aminoplast resin bases as described herein for preparing stable solutions having cationic and anionic functional groups which can be interreacted by addition of acids. They can also be advantageously used by themselves in leather treatment whereby the stability under acidic conditions can be of importance in operations such as pretanning, tanning of pickled stock or when metal salt tannages are first submitted to an anionic retanning operation followed by an aminoplast resin treatment or with mixtures of other aminoplast resins and anionic linear polymers. Observations indicate improved tightness of the grain when applied on metal salt tannages.

In preparing amide ammonium salts of the aforesaid polymers, ammonia gas is passed through the polymer in its anhydride form at room temperature or at slightly elevated temperatures. Two mols of ammonia gas are utilized per anhydride group.

When preparing amide amine salts, primary or secondary amines such as ethanolamine, diethanolamine and propanolamine are reacted with the polymer in its anhydride form at, e.g., 50° C. to 80° C. in an inert solvent such as dioxane or dimethylformamide. Two mols of amine are utilized per anhydride group. Of course, if further reaction of the amide amine salt is to be carried out, then only primary amines can be used in the preparation of the amide amine salt. The resulting water soluble compounds can be mixed with stable aminoplast resins to form stable solutions. The end use of the amide ammonium and amide amine salts is similar to those previously described when the free acids as well as the partially or completely neutralized linear polymers are used in conjunction with stable aminoplast resins. However, as the potential anionic property is weakened by the amide group, subsequent inter-reaction by acidification is of a lesser degree. Instead of a strong precipitate, only milky or colloidal or semicolloidal solutions are formed. Such forms of inter-reaction are desired particularly when better penetration and slower fixation in the substrate are required. The amide derivatives of the linear polymers are also suitable for condensation with aminoplast resins.

When modifying the polymers with salts of sulfoaminomethane, e.g., the alkali metal salts such as sodium and potassium, the following procedure can be used. The salts of the anionic linear polymers heretofore described, the polymer, i.e., a one-half neutralized polymer, which still has remaining one free carboxylic acid group. Reaction is achieved by heating and driving off the water formed during reaction. One mol of the salt of sulfoaminomethane is utilized per free carboxylic acid group of the polymer. Also, monosubstituted derivatives of the salts of sulfoaminomethane can be used such as the sodium salt of sulfohydroxyethylaminomethane. These condensates demonstrate increased acid stability.

Other useful and improved condensation products of anionic character are obtained when salts of sulfohydroxymethane, e.g., alkali metal salts such as sodium or potassium, are condensed with the amide ammonium salts of the anionic linear polymers heretofore described. One mol of the salt of sulfohydroxymethane is utilized for each amide group in the polymer. These anionic condensates can be further condensed under prolonged heating with formaldehyde which reacts with the ammonium salt to form methylol amine. One mol of formaldehyde is utilized per each ammonium salt group. The final condensate shows increased stability to metal salts and has good pigment dispersing and suspending qualities.

When the amide ammonium salts of a copolymer containing approximately equimolar amounts of styrene and maleic anhydride are used in the condensation with the salt of sulfohydroxymethane, an acid stable anionic polymer is produced. Useful anionic polymers can also be produced when the amide group of the amide ammonium salt of the anionic linear polymer is condensed with itaconic acid. One mol of itaconic acid is utilized per amide group which is present in the polymer. It has been found that the alkali metal salts, e.g., sodium and potassium, of the condensate of itaconic acid and the amide ammonium salt of a polymer containing approximately equimolar quantities of ethylene and maleic anhydride are good pigment dispersing agents. When a copolymer containing approximately equimolar amounts of styrene and maleic anhydride as amide ammonium salt is used in the condensation with itaconic acid, a condensate is produced which shows good stability at lower pH.

A particularly outstanding copolymer is obtained when from about one to three mols of acrylamide are copolymerized with one mol of itaconic acir or one mol of a substantially neutralized salt of itaconic acid, e.g., the sodium, potassium or ammonium salt in presence of a polymerization catalyst, e.g., potassium persulfate. Heating at about 75° C. for approximately 4 hours is sufficient to bring about copolymerization. The resulting product is an outstanding dispersing agent and adhesive when utilized alone either in its free acid or substantially neutralized salt form. It can also be admixed with stable aminoplast resins for preparing stable solutions having cationic and anionic functional groups which can be inter-reacted by addition of acids. The copolymerization product of acrylamide and salt of itaconic acid can be modified through saponification of the amide groups which are present to various degrees. This is accomplished by treatment with an alkali, e.g., sodium or potassium hydroxide. An anionic linear polymer having outstanding dispersing properties will result. This product can be dried to form a white to tan easily water soluble material.

AMINOPLAST RESINS AND AMINO RESIN BASES

The cationic aminoplast resins, the amphoteric aminoplast resins, and their amino resin bases and amphoteric amino resin bases can be described as follows. The cationic aminoplast resins are prepared by interreacting or condensing an amino resin base with an aldehyde, preferably formaldehyde, or a compound which liberates formaldehyde such as paraformaldehyde, trioxane and hexamethylenetramine. The amino resin bases can be characterized as low molecular weight nitrogen containing compounds which, by reaction between the hydrogen of the amine with aldehydes, form methylol derivatives in monomeric or polymeric form thus producing resinous materials of colloidal nature.

Examples of amino resin bases which are condensed with formaldehyde are dicyandiamide, guanidine, guanylurea, urea, thiourea, biuret, melamine, ameline, amelide, cyanuric acid, guanamine as well as their mixtures and derivatives. The aminoplast resins obtained as indicated above are generally characterized as cathionic to various degrees, as water soluble or water dispersible and preferably should have a long and unlimited shelf life, i.e., should not undergo physical or chemical change upon standing for long periods of time. Exemplary of these cationic aminoplast resins are those described in British Patent No. 777,827, June 26, 1957. The resins described herein are characterized by their excellent shelf life. This results from the elimination of free methylol groups of the resin by reaction with aminoplast bases such as those given above. Other useful cationic aminoplast resins are those set forth in U.S. aPtent No. 2,847,-396, Sellet, August 12, 1958, i.e., the resins prepared in column 1, line 71, to column 2, line 15. The degree of cationic activity in the aminoplast resin is shown by inter-reaction with anionic materials and is related to the degree of polymerization and molecular size. Aminoplast resins which are strongly cationic in nature are the higher molecular weight resins having a high degree of polymerization. Aminoplast resins having a lesser degree of cationic activity have lower molecular weights resulting from a lower degree of polymerization. Also, the presence of carbonamide groups tends to reduce the degree of cationic activity.

The amphoteric aminoplast resins are cationic aminoplast resins which have been modified by introducing anionic substitutents into them such as carboxy groups and sulfo groups. The nature of the anionic substituent taken in connection with the nature of the cationic substitutents of the aminoplast resin will determine whether cationic or anionic properties will predominate in the amphoteric resin. That is, the amphoteric aminoplast resins can vary in their nature from predominately cationic to predominately anionic resins. The reason for utilizing aminoplast resins varying in nature from cationic to amphoteric, i.e., from strongly cationic to weakly cationic is as follows. When strongly cationic resins are utilized in connection with the anionic linear polymers, whether as mixtures, complex salts or condensates, and applied to a substrate such as leather and then precipitated with an acid, a fast inter-reaction occurs between the components, i.e., an immediate and heavy precipitate will be formed in the leather. On the other hand, when amphoteric aminoplast resins are utilized in connection with the anionic linear polymers, whether as mixtures, complex salts or condensates and applied to a substrate such as leather and then inter-reacted with an acid, a weaker and slower inter-reaction occurs between the components as compared to the reaction when a strongly cationic resin is used. This slower inter-reaction or precipitation is utilized when a more complete penetration is desired. Thus, when amphoteric aminoplast resins are utilized, an advantage is the fact that the acid sensitivity is of a lower degree.

Suitable amphoteric aminoplast resins are as follows. Any water soluble or water dispersible cationic aminoplast resin including those given above can be modified to form amphoteric resins by introducing either during or after their preparation anionic functional groups such as carboxylic and sulfo groups. Useful amphoteric aminoplast resins can be found in U.S. Patent No. 2,847,396, Sellet, August 12, 1958. That is, the amino-modified stage A resins described therein can be modified as set forth in column 3, lines 9 to 38 of this patent. Likewise the resins obtained by carrying out stages one and two described in U.S. Patent No. 2,870,122, Sellet, January 20, 1959, can be modified as set forth in column 4, lines 13 to 39, of this patent. The products prepared according to British Patent No. 777,827, June 26, 1957, are particularly suited for transformation into amphoteric aminoplast resins.

Other useful amphoteric aminoplast resins can be prepared by condensing unsaturated dibasic acids such as itaconic acid, maleic acid and maleic anhydride or their monoammonium salts with equimolar amounts of dicyandiamide in aqueous solution. Upon prolonged heating, e.g., at reflux for, e.g., four to six hours, condensation occurs simultaneously with saponification of the nitrile group. This has been demonstrated by infra-red analysis. Also, in the case of itaconic acid, the double bond disappears as indicated by infra-red analysis. This would indicate lactam formation. The above condensates, e.g., of itaconic acid and dicyandiamide, can be admixed with the anionic linear polymers previously described or alternatively condensed at elevated temperatures with said linear polymers. If desired, the condensates of dicyandiamide and itaconic or maleic acid or anhydride can be condensed with aldehydes. Preferably the condensate of itaconic or maleic acid and dicyandiamide is condensed with from one to four mols of aldehyde, e.g., formaldehyde and then mixed or condensed with the anionic linear polymers.

Another type of aminoplast resin can be prepared by first preparing a monoammonium or mono-primary amine salt of itaconic acid or maleic acid. The amine salts are obtained from reaction with lower alkanolamines such as ethanolamine. One mol of this product is in turn reacted with one mol of an aldehyde, e.g., formaldehyde, resulting in the acid salt of the methylolated amine. An amino resin base, dicyandiamide, in equimolar amounts with regard to the itaconic or maleic acid, is then introduced and condensed with the methylolated amine. Through prolonged heating in presence of water further condensation occurs between the newly formed amine compound, and the acid thus yielding a lactam. Also, the nitrile group is saponified. These products when further reacted with an aldehyde, e.g., from one to 4 mols can be admixed with the aforesaid anionic linear polymers to produce stable materials for treating the various substrates referred to herein. Preferably the amphoteric resins and the linear polymers are utilized in their partially or completely neutralized state. The above condensation products prepared from the itaconic or maleic acids or anhydride possess a higher cationic functional property when compared with a condensate of itaconic acid and dicyandiamide alone.

Also, modified amino resin bases, e.g., the sodium or potassium salt of sulfomethyl dicyandiamide can be reacted with an aldehyde, e.g., from one to three mols of formaldehyde per mol of modified amino resin base and the resulting amphoteric aminoplast resin utilized in admixture or as a condensate with the anionic linear polymers. Sulfomethyl dicyandiamide is also known as (cyano-guanidino) methane sulfonic acid:

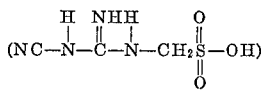

Examples of useful amino resin bases which can be condensed with the anionic linear polymers are dicyandiamide, guanidine, guanylurea, urea, thiourea, biuret, melamine, ameline, amelide, cyanuric acid, guanamine, as well as their mixtures and derivatives. Examples of amino amphoteric resin bases which can be condensed with the anionic linear polymers are the sodium salt of sulfomethyl dicyandiamide and condensates of dicyandiamide and itaconic acid or maleic acid or maleic anhydride.

When my two components are utilized as mixtures or as complex salts with the anionic linear polymers and subsequently precipitated upon a substrate by addition of an acid, they can be utilized in approximately equimolar amounts. However, this is not to be construed as a limiting relationship because either of my two components can be present in varying molar excesses over the other component. This will depend upon the final effects which are desired. For example, leather treated with a copolymer containing approximately equimolar amounts of styrene and maleic acid will receive dye rather poorly. However, even the presence of a small amount of aminoplast resin will enhance the affinity of the dye. Thus, as merely indicative, but not limiting, my two components when utilized as mixtures or compdex salts can be present in a molar relationship of from 1:15 to 15:1 with regard to each other.

When my two components are utilized either as a mixture, complex salt or as a condensate in connection with the treatment of a substrate the substrate is maintained in aqueous medium. Additionally, water soluble solvents, e.g., water soluble alcohols, glycols, esters and ethers can be present. My two components when utilized separately to form a mixture or as a complex salt or as a condensate can be added to the substrate as aqueous solutions, aqueous dispersions or as dry solids whenever the components are of such a nature that they can be obtained in the form of solids. For example, the anionic linear polymers as well as the cationic aminoplast resins and their amino and amphoteric amino resin bases can be prepared as solids by removing the water, e.g., by boiling, roll drying or spray drying to form solid material. The solid material can be ground or flaked as desired. Likewise, the condensates of the above components can be utilized as solutions, dispersions or as solids.

CONDENSATES OF ANIONIC LINEAR POLYMERS AND AMINOPLAST RESINS AND AMINO RESIN BASES

With regard to the preparation of condensates of my two components, which can be applied to a substrate, the following is set forth.

Cationic aminoplast resins, preferably those which have their methylol groups substantially blocked off, can be condensed with anionic linear polymers which have a free carboxyl group available for reaction with the available hydrogen of the cationic aminoplast resin. Provision must be made so that the resulting condensate has amphoteric characteristics. This can be accomplished by condensing one mol of aminoplast resin with one mol of an anionic linear polymer which preferably has its second carboxyl group neutralized. That is, one mol of aminoplast resin is utilized for each free carboxy group of the linear polymer.

Water soluble anionic linear polymers in their free acid or as partially neutralized forms whether modified or unmodified, such as those heretofore described can be reacted with aminoplast resin bases such as those previously described. Thereafter, the resulting condensate can be subsequently reacted with an aldehyde, e.g., formaldehyde. For example, linear polymers which are water soluble as free acids or as their partially neutralized salts can be used as modifying agents for aminoplast resin bases such as dicyandiamide. When the two were dissolved in water in equimolar proportions and heated for several hours, the pH which at the start shows a pH value of 2.4, rose gradually to 4.6. Infra-red analysis showed disappearance of the nitrile group. Generally, a water solution or slurry in water of both reactants is first heated preferably near the boiling point of water. More heat is then applied to reach temperatures above 100° C., preferably between 115° to 120° C. in order to drive off the water and to bring about condensation. The reaction product is then treated with aldehyde, preferably 3 to 4 mols of formaldehyde to produce an aminoplast resin of amphoteric character. The reaction product is then substantially neutralized and forms a stable solution.

Other amphoteric condensates can be prepared by condensing the aforesaid anionic linear polymers with modified aminoplast and amphoteric aminoplast resin bases, e.g., the sodium or potassium salts of sulfomethyl dicyandiamide or the condensate of itaconic acid or maleic acid or anhydride and dicyandiamide. When an amino base is used, subsequent treatment with an aldehyde, preferably 1 to 4 mols of formaldehyde, is utilized.

Some of the aforesaid products which are useful in particular as pigment dispersing agents are obtained when an aminoplast resin base, in particular dicyandiamide, is first condensed with, e.g., itaconic acid to form an amphoteric resin base having reactive primary or secondary amino groups. Then further condensation with anionic linear polymers as free acids or their anhydrides is carried out. The amphoteric resin base and linear polymer are first dissolved in water, preferably in equimolar proportions. After evaporation of the water present, the condensation is carried through at temperature above 100° C. preferably between 110° to 120° C. The resulting condensation product is then neutralized to pH of 8.5 to 9.

Condensation products of similar characteristics can also be prepared by condensing a dicyandiamide maleic acid reaction product with said linear polymers. The above mentioned types of condensation products are particularly useful as pigment dispersants.

Other amphoteric condensates can be prepared by reacting amide ammonium salts of the aforesaid anionic linear polymers with methylolated amphoteric resins.

NATURE OF SUBSTRATE

As previously indicated, my two components whether as a mixture, complex salt or as a condensate can be applied to many diverse substrates. Exemplary of these substrates are porous or fibrous substrates such as leather, paper, wool, cork, non-woven textiles or bats, such as felt and Masslin, woven textiles of cotton, wool, silk, rayon, regenerated cellulose, nylon, Dacron, polyacrylonitrile and others. When my two components are utilized as dye assistants they can be used in connection with the above indicated woven and non-woven textiles. Additionally, they can be used in connection with the dying of yarns and filaments. Synthetic yarns, filaments and woven and non-woven textiles can be treated with my components such as nylon, Dacron, polyacrylonitrile etc.

In the treatment of a substrate such as leather from about 3% to about 20% my products are utilized based on the weight of the wet shaved leather.

Throughout this specification, wherever molar amounts of linear polymer are referred to this means one reoccurring molar group regardless of the specific reactive substituents therein. For example, in a polymer obtained by copolymerizing equimolar quantities of itaconic acid and ethylene, each reoccurring itaconic acid-ethylene group is deemed to be one molar group.

The following examples are directed to the preparation of mixtures, complex salts and condensates of my two components. It must be kept in mind that the mixtures can be applied to a substrate and then treated with acid to bring about inter-reaction and precipitation or else the substrate can be treated in succession with the two components after which the acid treatment is carried out. Likewise, in the use of complex salts, the complex salt can be applied to the substrate and then treated with acid to bring about inter-reaction and precipitation or else the substrate can first be treated in succession with the two components which react and form the complex salt after contact with the substrate and then treated with acid to bring about precipitation and inter-reaction.

*Example I.—Preparation of an amphoteric aminoplast resin*

208 grams of sodium bisulfite were dissolved in 200 grams of water. 162 grams of formaldehyde (37% by weight aqueous solution) were then added to the bisulfite solution and the solution heated to 75° C. 168 grams of dicyandiamide were then introduced. Heat was applied to bring temperature up to 95° C. and was maintained for one hour. 326 grams of formaldehyde (37% by weight aqueous solution) were then added and the reaction completed by heating and refluxing for 5 hours at 95° C. The resulting reaction product was a water soluble amphoteric aminoplast resin.

532 grams of above resin solution was introduced with stirring into 526 grams of a 25% by weight aqueous solution of an anionic linear copolymer which contained equimolar amounts of maleic anhydride and ethylene. The copolymer had been previously hydrolyzed so that it was in the form of its free acid.

The amphoteric aminoplast resin and the anionic linear polymer formed under addition of acids a slight semi-colloidal solution. This product is useful when good and even penetration of a substrate such as leather is required.

*Example II*

An amphoteric aminoplast resin was first prepared as follows.

104 grams of sodium bisulfite were dissolved in 100 grams of water. Then 81 grams of formaldehyde (37% by weight aqueous solution) were added with strong stirring while maintaining the temperature at about 75° C. Then 84 grams of dicyandiamide were added to form the sodium salt of sulfo methyl dicyandiamide. The mixture was heated to between 90° C. to 95° C. for 1 hour after which two mols (162 grams) of formaldehyde (37% by weight aqueous solution) were introduced and the reaction completed by heating for 5 hours at 95° C.

The above prepared amphoteric aminoplast resin was then introduced into 970 grams of a 25% by weight aqueous solution containing a monosodium salt of a copolymer prepared by partially nentralizing a copolymer containing equimolar amounts of styrene and of maleic anhydride thus forming a complex salt between the amphoteric resin and the half salt of the polymer.

This material when inter-reacted in the presence of acids is particularly suitable for bleaching and retanning chrome stock and where good penetration of the substrate, particularly leather, is required.

Having described my invention, what I claim is new and desire to secure by Letters Patent is:

Amphoteric aminoplast resins consisting essentially of condensates of alkali metal salts of sulfomethyl dicyandiamide and from one to three mols of formaldehyde.

References Cited by the Examiner

UNITED STATES PATENTS

| | | | |
|---|---|---|---|
| 2,052,897 | 4/1950 | Smith | 260—513 |
| 2,737,464 | 3/1956 | Dawson | 117—141 |
| 2,737,504 | 3/1956 | Dawson | 260—70 |
| 2,870,122 | 1/1959 | Sellet | 260—69 |

WILLIAM H. SHORT, *Primary Examiner*,

H. SCHAIN, *Assistant Examiner*,